March 8, 1966 HUA-TUNG LEE 3,239,769

FM DETECTORS EMPLOYING EXPONENTIAL FUNCTIONS

Filed March 27, 1963 2 Sheets-Sheet 1

INVENTOR
HUA-TUNG LEE

BY Francis J. Thomas
ATTORNEY

United States Patent Office 3,239,769

Patented Mar. 8, 1966

3,239,769
FM DETECTORS EMPLOYING EXPONENTIAL FUNCTIONS

Hua-Tung Lee, Peekskill, N.Y., assignor to International Business Machines Corporation, New York, N.Y., a corporation of New York Filed Mar. 27, 1963, Ser. No. 268,432
8 Claims. (Cl. 329—111)

This invention is related to detecting circuits for data transmission systems and, in particular, to techniques for operating on frequency-modulated signals bearing digital data intelligence.

A technique for accurately transmitting digital data is described in a copending U.S. patent application, Serial Number 169,332, filed on January 29, 1962, by William A. Florac, Jr., Hans Y. Juliusberger and Arthur A Kusnick. In this application, binary data transmission is described wherein a signal is transmitted which, at any instant, comprises energy in one of two frequencies, depending upon the instantaneous binary data value being transmitted. That is, a binary data value of "1" causes energy in a first frequency to be transmitted and a binary data of "0" causes energy in a second frequency to be transmitted. In this copending application, one frequency is double the other frequency so that one cycle of the higher frequency has a duration equal to one half cycle of the lower frequency. An optimum data transmission rate is achieved by transmitting only one cycle of the higher frequency or one half cycle of the lower frequency for each binary data element. This technique has obvious speed advantages over those techniques in which a burst of energy consisting of several or many cycles is transmitted for each binary data elements. The reception and detection of the modulating data is more critical when only a single or half cycle of energy is transmitted, rather then when bursts of energy are transmitted, and conventional frequency-modulated detecting equipment do not provide reliable operation until several cycles of data at approximately the same frequency are received. Other techniques, such as zero-crossing detection, may be employed if that data applied to the detection circuits has exactly the same frequency components as the transmitted data. However, when the data is transmitted over many types of common carrier transmission lines, the signal presented to the detection circuits is usually phase-shifted by at least several cycles per second, prohibiting the use of a zero-crossing detector or similar circuit. Although only one of the two reference frequency signals is selected for transmission at any given time (depending upon the value of the binary data element), the resulting signal includes side band energy, such that the transmitted data has a frequency spectrum which includes two overlapping bands of frequencies. For this reason, conventional amplitude modulation detector cannot be used to sense the transmitted data.

In the present invention the transmitted data (with or without the unwanted frequency shift) is applied to circuits which separate the energy in the two overlapping bands of frequencies (only one of which contains energy at any given time). The energy in the separated bands is then sensed by conventional amplitude-modulation detectors. In a preferred embodiment of the present invention, the frequency bands are separated by operating on the transmitted signal with an exponential function and, in particular, with two stages of function squaring. The overlapping frequency bands are thus isolated and two amplitude-modulation detectors are used to sense the presence or absence of data in each of the separated frequency bands. Since the transmitted energy is present in only one frequency band at a time, the use of separate detectors provides an additional error detecting feature where an error is indicated when both detectors or neither detector provides an output.

Various features of the invention are briefly summarized in the following objects.

An object of the present invention is to show techniques for detecting a time-varying signal having energy in a plurality of frequency bands.

Another object of the present invention is to show techniques for detecting a time-varying signal having energy in a plurality of frequency bands where the energy is present in only one band of frequencies at any time.

Another object of the present invention is to show techniques for detecting a time-varying signal having energy in two frequency bands where the energy is present in only one band of frequencies at any time.

A further object of the present invention is to show techniques for detecting a frequency modulated time-varying signal having energy in a plurality of frequency bands which overlap the adjacent band or bands wherein an exponential function of the signal is generated to separate the energy-bearing frequency bands.

Another object of the present invention is to show techniques for detecting a frequency modulated time-varying signal having energy in two overlapping frequency bands wherein an exponential function of the signal is generated to separate the energy-bearing frequency bands.

A further object of the present invention is to show techniques for detecting a frequency modulated time-varying signal having energy in a plurality of frequency bands which overlap the adjacent band or bands, where the energy is present in only one band of frequencies at any time, and wherein an exponential function of the signal is generated to separate the energy-bearing frequency bands.

A further object of the present invention is to show techniques for detecting a frequency modulated time-varying signal having energy in a plurality of frequency bands which overlap the adjacent band or bands wherein a square law function of the signal is generated to separate the energy-bearing frequency bands.

A further object of the present invention is to show techniques for detecting a frequency modulated time-varying signal having energy in two overlapping frequency bands wherein a square law function of the signal is generated to separate the energy-bearing frequency bands.

A further object of the present invention is to show techniques for detecting a frequency modulated time-varying signal having energy in a plurality of frequency bands which overlap the adjacent band or bands wherein the signal is operated on by a multi-stage square law function generator to provide separated energy-bearing frequency bands.

Another object of the present invention is to show techniques for detecting a frequency modulated time-varying signal having energy in two overlapping frequency bands wherein the signal is operated on by a two-stage square law function generator to provide separated energy-bearing frequency bands.

A still further object of the present invention is to show techniques for detecting a frequency modulated time-varying signal having energy in a plurality of frequency bands which overlap the adjacent band or bands wherein the signal is operated on by a multi-stage exponential function generator to provide separated energy-bearing frequency bands.

A still further object of the present invention is to show techniques for detecting a frequency modulated time-varying signal having energy in two overlapping frequency bands wherein the signal is operated on by a multi-stage exponential function generator to provide separated energy-bearing frequency bands.

A still further object of the present invention is to show techniques for detecting a frequency modulated time-varying signal having energy in a plurality of frequency bands which overlap the adjacent band or bands wherein the signal is operated on by a two-stage exponential function generator to provide separated energy-bearing frequency bands.

The foregoing and other objects, features and advantages of the invention will be apparent from the following more particular description of a preferred embodiment of the invention, as illustrated in the accompanying drawings.

Figure 1:
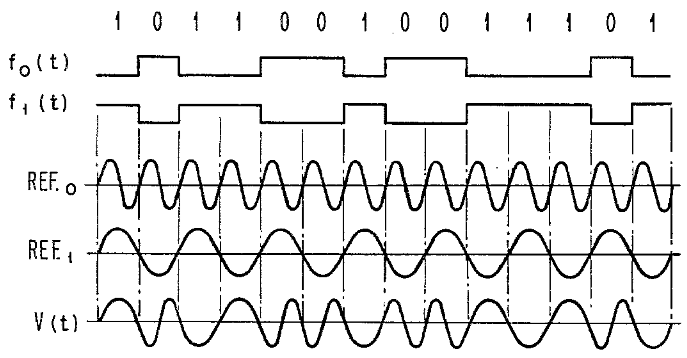
FIGURE 1 is a group of diagrams showing binary data, two reference signals having different frequencies, and the resulting frequency modulated signal.

In the preferred embodiment of the invention, a frequency modulated signal having energy in two bands of frequencies is transmitted, where the presence of energy in one band of frequencies corresponds to a binary data element having a value of "0," and the presence of energy in the other band of frequencies corresponds to a "1" binary data element. The two constituent reference frequency signals are shown in FIGURE 1 and are labelled "$REF_0$" and "$REF_1$." The frequency of the $REF_0$ signal is twice that of the $REF_1$ signal as shown in FIGURE 1. The transmitted signal, labelled "$V(t)$," contains portions of the $REF_0$ signal and the $REF_1$ signal as controlled by the values of the binary data elements, examples of which are shown across the top of FIGURE 1. The composition of the transmitted signal "$V(t)$" is described in detail in the afore-mentioned copending patent application, Serial Number 169,332 and will be summarized here. The binary data elements to be transmitted are converted into two time-varying signals labelled "$f_0(t)$" and "$f_1(t)$," as shown in FIGURE 1. These binary time-varying signals are mutually-exclusively present. That is, when the $f_0(t)$ signal is at its lower value indicating that the binary data element is not a "0," the $f_1(t)$ signal is at its upper value indicating that the binary data is a "1." Similarly, when the $f_0(t)$ is at its upper value, indicating that the binary data element is a "0," the $f_1(t)$ signal is at its lower value, indicating that the binary data element is not a "1." The binary time-varying signals $f_0(t)$ and $f_1(t)$ are used to select either the $REF_0$ signal or the $REF_1$, at any given time, as the resultant signal $V(t)$. Although only one phase of the $REF_0$ and $REF_1$ signals are shown, the inversion (180° phase shift) of these signals is available and the selected phase is determined by the phase of the immediately-preceding signal $V(t)$ and is selected such that the resulting signal $V(t)$ contains no abrupt phase changes. That is, if the signal $V(t)$ is moving in a negative-going direction, the succeeding signal is selected (either $REF_0$ or $REF_1$, depending upon the value of the binary data element) to continue the negative going direction of the signal. For example, in FIGURE 1 during the first interval of time, the signal $V(t)$ corresponds to the binary data element "1" and is a positive half cycle of the signal $REF_1$. Since the signal $V(t)$ is "negative-going" toward the end of the first interval of time, the inverted version of the $REF_0$ signal is applied during the second interval (corresponding to a "0" binary data element) to maintain a smooth transition in the output signal $V(t)$. Note that if the uninverted signal $REF_0$ were to follow the positive half cycle of the $REF_1$ signal there would be an abrupt change in the output signal $V(t)$ at the end of the first data element. Thus, the values of the binary data elements are used to select either the $REF_0$ or $REF_1$ signal as the output signal $V(t)$ at any given time and the inverted version of the reference signals is used where necessary to avoid abrupt changes in the output signal.

Figure 2:
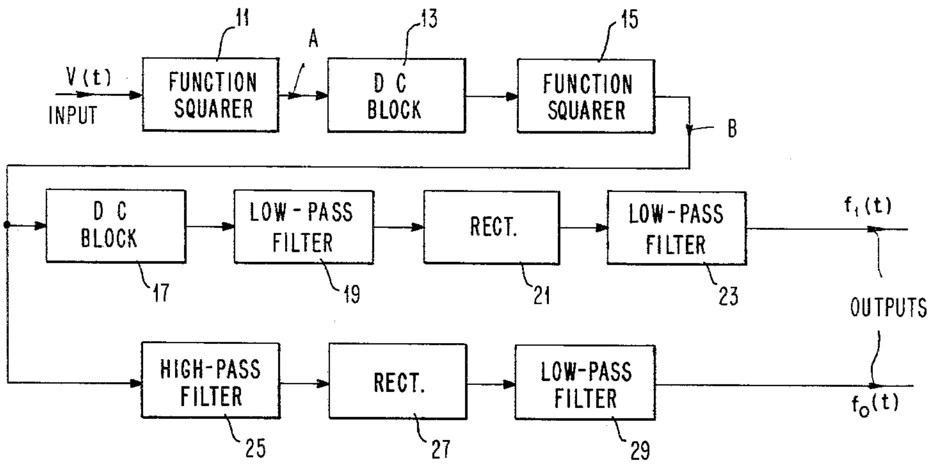
FIGURE 2 is a diagram showing a preferred embodiment of the invention.
Figure 3:
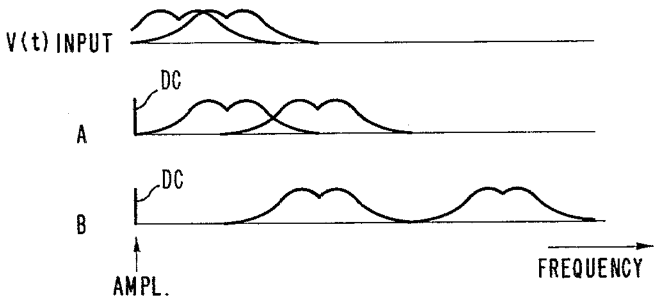
FIGURE 3 is a group of diagrams showing the signal frequency spectrum at various stages of the preferred embodiment.

A preferred embodiment of the present invention is shown in detail in FIGURE 2. A transmitted signal $V(t)$, as described with respect to FIGURE 1, is applied to the input of the system of FIGURE 2. The function of the circuits in FIGURE 2 is to demodulate the frequency modulated signal $V(t)$ to generate binary output signals $f_1(t)$ and $f_0(t)$, as shown in FIGURE 1. FIGURE 3 shows the frequency spectrum of the applied signal $V(t)$ and the frequency spectrums present in the signals at points in the circuit labelled "A" and "B." Although the applied signal $V(t)$ contains, at any given time, energy in either the low frequency band or the high frequency band depending upon the value of the corresponding binary data element, the bands overlap to a great extent.

The input signal $V(t)$ is applied to a function squaring circuit 11 which will be described in detail with respect to FIGURE 4. This circuit provides an output signal labelled "A," which corresponds to the applied signal $V(t)$ except that the frequency bands have been separated as shown in FIGURE 3.

The frequency spectrums of the two bands of energy are separated by the use of a squaring function in accordance with the well-known trigonometric identity:

$$\sin^2 \theta = \frac{1}{2} - \frac{1}{2} \cos 2\theta$$

Thus, if "sinusoidol" energy at a frequency $\theta$ is squared, the result is "sinusoidol" energy at a frequency $2\theta$ (as represented by $-\frac{1}{2} \cos 2\theta$) and a D.C. component ($\frac{1}{2}$). The signal $V(t)$ contains energy at the frequencies of $REF_0$ and $REF_1$ (FIGURES 1 and 3) where the former frequency is double the latter frequency. Waveshape A (FIGURE 3) represents the frequency spectrum of the two energy components of the signal $V(t)$ after squaring and it can be seen that the center frequency of each band of energy is doubled. Thus, the distance between the center frequencies is doubled. E.g., if the signal $V(t)$ contains energy that is centered at 10 kc. and 20 kc. (separated by 10 kc.), the signal after squaring contains energy at 20 kc. and 40 kc. (separated by 20 kc.) and the distance between center frequencies is doubled. As stated above, only one of the two bands of energy is present at any given time depending upon the value of the transmitted binary data elements. For this reason, the sideband energy in the two frequency bands is essentially unspread because of the interaction in their harmonic content by the squaring operation, so that the overlap in the frequency spectrums between the energy bands is decreased.

The output of the function squaring circuit 11 is applied to a D.C. blocking circuit 13 which inhibits the D.C. component of the signal from the function squaring circuit. Many D.C. blocking circuits are well known, and the function may be simply performed by a capacitor. The D.C. component of the signal is eliminated to provide a signal in the proper form for the input to a second squaring circuit 15 to enable it to operate in accordance with the above trigonometric identity.

The second function squaring circuit 15 further spreads the frequency bands as shown by the output waveshape "B" in FIGURE 3. This circuit operates in the same manner as the function squaring circuit 11 described above to provide an output signal which, at any given time, is in either one or the other of the two separated frequency bands.

The output of the second function squaring circuit 15 is applied to two amplitude modulation detection circuits which provide output signals $f_1(t)$ and $f_0(t)$. In the $f_1(t)$ channel, energy in the lower frequency band is passed by the combination of a D.C. blocking circuit 17 and a low pass filter 19. The blocking circuit inhibits the passage of the D.C. component in the signal (waveshape "B") and the low pass filter blocks the passage of the high frequency portion of this signal. The output of the low pass filter 19 is applied to a conventional amplitude modulation detection circuit comprised of a rectifier 21 and a low pass filter 23. The output of the low pass filter corresponds generally to $f_1(t)$ shown in FIGURE 1, but is somewhat distorted in the regions of transition from one value to the other.

The output of the second function squaring circuit 15 is also applied to a high pass filter 25 which selects the energy in the high frequency band (waveshape "B," FIGURE 3). The output of this filter is applied to another conventional amplitude modulation detector, comprising a rectifier 27 and low pass filter 29, to provide the output signal $f_0(t)$ shown in FIGURE 1.

Since the two output signals are mutually-exclusively present, an error detecting circuit (not shown) can be employed to provide an indication of an error whenever both or neither of the output signals $f_1(t)$ and $f_0(t)$ are present.

Although binary data transmission has been described, the system may be altered in an obvious manner to include data having three or more values. For example, three-level data may be used to modulate three reference signals which are applied to a three-channel detection circuit.

Two stages of function squaring are employed in the preferred embodiment of the invention, but the system is operable with only one squaring stage or with three or more of these stages. Furthermore, any exponential function containing an exponent greater than unity may be used in place of the squaring function that is shown in the preferred embodiment. Thus, the invention can be successfully practiced by using many exponential functions in a variety of configurations employing any number of stages.

Figure 4:
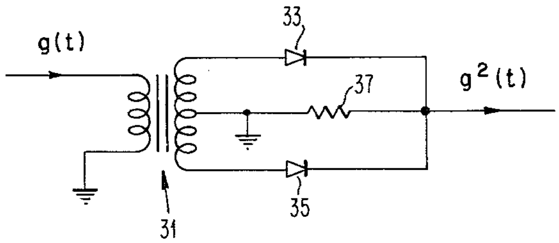
FIGURE 4 is a detailed diagram showing a function squaring circuit that is suitable for use in the preferred embodiment of FIGURE 2.
Figure 5:
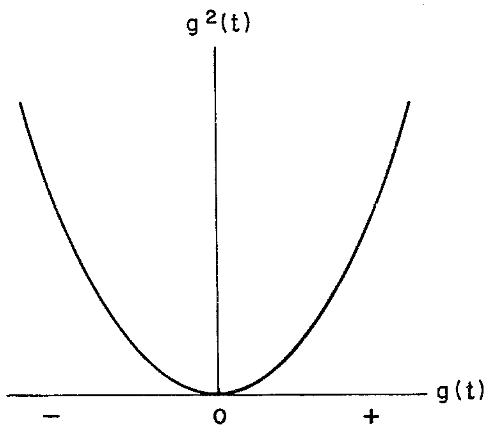
FIGURE 5 is a diagram showing characteristics of the function squaring circuit of FIGURE 4.

A function squaring circuit that can be used in conjunction with the embodiment of FIGURE 2 is shown in detail in FIGURE 4. A signal $g(t)$ is applied through a transformer 31 to two diodes 33 and 35. By the action of the transformer, the signal $g(t)$ is applied in phase to one diode and out of phase by 180° to the other diode. The circuit operates in a manner similar to a full wave rectifier, but with the characteristic curve shown in FIGURE 5. The applied signal $g(t)$ (horizontal axis) causes current to flow through one of the diodes (dependent upon the polarity of the signal) and through a resistor 37 to provide an output voltage $g^2(t)$ (vertical axis). The diodes have square law characteristics which produce the parabolic response curve shown in FIGURE 5.

While the invention has been particularly shown and described with reference to a preferred embodiment thereof, it will be understood by those skilled in the art that various changes in form and details may be made therein without departing from the spirit and scope of the invention.

What is claimed is:

1. A circuit for demodulating a frequency modulated, time-varying signal comprising, in combination:
means responsive to the time-varying signal for generating a second time-varying signal which is dependent solely upon the original time-varying signal and is related to this signal by an exponential function;
means responsive to the second time-varying signal for generating a third time-varying signal which is dependent solely upon the second time-varying signal and is related to this signal by an exponential function; and
means responsive to the third time-varying signal for providing an indication of the existence of energy in at least one predetermined band of frequencies.

2. A circuit for demodulating a frequency modulated, time-varying signal comprising, in combination:
means responsive to the time-varying signal for generating a second time-varying signal which is dependent solely upon the original time-varying signal and is related to this signal by a square law function;
means responsive to the second time-varying signal for generating a third time-varying signal which is dependent solely upon the second time-varying signal and is related to this signal by a square law function; and
means responsive to the third time-varying signal for providing an indication of the existence of energy in at least one predetermined band of frequencies.

3. A circuit for demodulating a frequency modulated, time-varying signal comprising, in combination:
a plurality of function generating means, each responsive to an input time-varying signal for generating an output time-varying signal which is dependent solely upon its input time-varying signal and is related to this signal by an exponential function where the input to a first of the function generating means is the frequency modulated, time-varying signal to be demodulated, and where the output of each of the function generating means except for the last of these means is applied as the input to another one of the function generating means; and
means responsive to the output of the last of the function generating means for providing an indication of the existence of energy in at least one predetermined band of frequencies.

4. A circuit for demodulating a frequency modulated, time-varying signal comprising, in combination:
a plurality of function generating means, each responsive to an input time-varying signal for generating an output time-varying signal which is dependent solely upon its input time-varying signal and is related to this signal by a square law function where the input to a first of the function generating means is the frequency modulated, time-varying signal to be demodulated, and where the output of each of the function generating means except for the last of these means is applied as the input to another one of the function generating means; and
means responsive to the output of the last of the function generating means for providing an indication of the existence of energy in at least one predetermined band of frequencies.

5. A circuit for demodulating a time-varying signal which is frequency modulated by a binary signal comprising, in combination:
function generating means responsive to the time-varying signal for generating a second time-varying signal which is dependent solely upon the original time-varying signal and is related to this signal by a square law function;
D.C. blocking means responsive to the second time-varying signal for passing the second time-varying signal without its D.C. component;
function generating means responsive to the output of the D.C. blocking means for generating a third time-varying signal which is dependent solely upon the signal from the D.C. blocking means and is related to this signal by a square law function;
a first filtering means responsive to the third time-varying signal for passing the energy in this signal which is in a range of frequencies below a first threshold frequency as a first system output; and
a second filtering means responsive to the third time-varying signal for passing the energy in this signal which is in a range of frequencies above a second threshold frequency as a second system output.

6. A circuit for demodulating a time-varying signal which is frequency modulated by a binary signal comprising, in combination:

function generating means responsive to the time-varying signal for generating a second time-varying signal which is dependent solely upon the original time-varying signal and is related to this signal by a square law function;

D.C. blocking means responsive to the second time-varying signal for passing the second time-varying signal without its D.C. component;

function generating means responsive to the output of the D.C. blocking means for generating a third time-varying signal which is dependent solely upon the signal from the D.C. blocking means and is related to this signal by a square law function;

a first filtering means responsive to the third time-varying signal for passing the energy in this signal which is in a range of frequencies below a first threshold frequency as a fourth time-varying signal;

a second filtering means responsive to the third time-varying signal for passing the energy in this signal which is in a range of frequencies above a second threshold frequency as a fifth time-varying signal;

a first amplitude modulation detecting means responsive to the fourth time-varying signal for providing a first time-varying system output indicative of the existence of energy in the fourth time-varying signal; and a second amplitude modulation detecting means responsive to the fifth time-varying signal for providing a second time-varying system output indicative of the existence of energy in the fifth time-varying signal.

7. A circuit for demodulating a time-varying signal which is frequency modulated by a binary signal comprising, in combination:

function generating means responsive to the time-varying signal for generating a second time-varying signal which is dependent solely upon the original time-varying signal and is related to this signal by a square law function;

D.C. blocking means responsive to the second time-varying signal for passing the second time-varying signal without its D.C. component;

function generating means responsive to the output of the D.C. blocking means for generating a third time-varying signal which is dependent solely upon the signal from the D.C. blocking means and is related to this signal by a square law function; and filtering means responsive to the third time-varying signal for passing the energy in the signal which is in a predetermined range of frequencies.

8. A circuit for demodulating a time-varying signal which is frequency modulated by a binary signal comprising, in combination:

function generating means responsive to the time-varying signal for generating a second time-varying signal which is dependent solely upon the original time-varying signal and is related to this signal by a square law function;

D.C. blocking means responsive to the second time-varying signal for passing the second time-varying signal without its D.C. component;

function generating means responsive to the output of the D.C. blocking means for generating a third time-varying signal which is dependent solely upon the signal from the D.C. blocking means and is related to this signal by a square law function; and means responsive to the third time-varying signal for providing an indication of the existence of energy in at least one predetermined band of frequencies.

References Cited by the Examiner

UNITED STATES PATENTS

| | | | |
|---|---|---|---|
| 2,356,390 | 8/1944 | Finch | 325—320 X |
| 2,397,961 | 4/1946 | Harris | 328—144 X |
| 3,028,487 | 4/1962 | Losee | 329—105 X |
| 3,048,658 | 8/1962 | Buff | 178—66 X |

HERMAN KARL SAALBACH, *Primary Examiner.*

ALFRED L. BRODY, *Examiner.*